No. 615,241.  Patented Dec. 6, 1898.
F. F. BIRCH.
STEAM BOILER.
(Application filed Feb. 8, 1898.)

(No Model.)

Witnesses:
Franck L. Ourand.
Jos. L. Coombs.

Inventor.
Foster F. Birch
by Sams Bagger & Co.
Attorneys

THE NORRIS PETERS CO., PHOTO-LITHO., WASHINGTON, D. C.

UNITED STATES PATENT OFFICE.

FOSTER FRANK BIRCH, OF DOVER, NEW JERSEY.

STEAM-BOILER.

SPECIFICATION forming part of Letters Patent No. 615,241, dated December 6, 1898.

Application filed February 8, 1898. Serial No. 669,540. (No model.)

*To all whom it may concern:*

Be it known that I, FOSTER FRANK BIRCH, a citizen of the United States, and a resident of Dover, in the county of Morris and State of New Jersey, have invented certain new and useful Improvements in Steam-Boilers; and I do hereby declare that the following is a full, clear, and exact description of the invention, which will enable others skilled in the art to which it appertains to make and use the same, reference being had to the accompanying drawings, which form a part of this specification.

My invention relates to steam-boilers; and its object is to provide an improved construction of the same in which the water is heated and steam formed in a rapid and efficient manner and with a comparatively small amount of fuel.

The invention consists in the novel construction and combination of parts hereinafter fully described and claimed.

Figure 1:
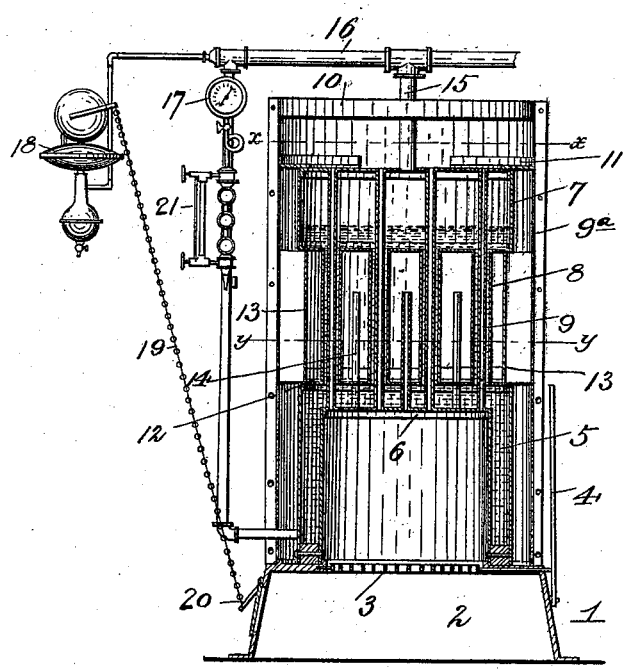
Figure 2:
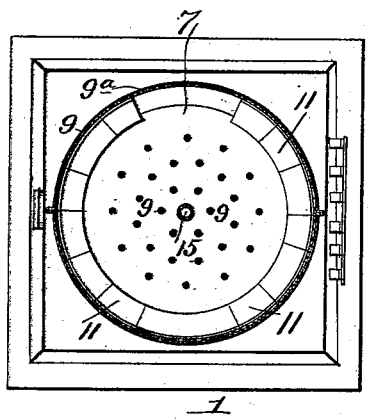
Figure 3:
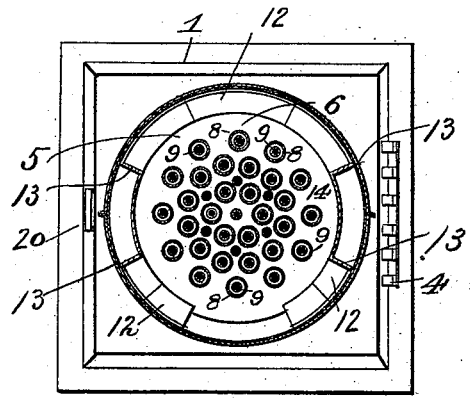

In the accompanying drawings, Figure 1 is a central vertical section of a steam-boiler constructed in accordance with my invention. Fig. 2 is a horizontal section on the line $x\ x$, Fig. 1. Fig. 3 is a similar view on the line $y\ y$.

In the said drawings the reference-numeral 1 designates the base of the boiler, preferably made of cast-iron, 2 the ash-pit, and 3 the rocking grate, operated by a handle 4.

The numeral 5 designates an annular water-chamber which also forms the fire-box. This water-chamber consists of two concentric cylindrical walls closed at the lower ends, which rest upon the base. The upper ends of these walls or cylinders are connected by crown-sheets 6, forming a horizontal continuation of the water-chamber.

The numeral 7 designates a cylindrical steam chamber or drum closed at the top and bottom, and connected with the bottom of said drum and with the upper crown-sheet are a number of vertical water-tubes 8, through which pass fire-tubes 9, passing through the steam-drum and through the lower crown-sheet 6. There is thus formed between said tubes a narrow space communicating with the water-chamber and steam-drum, so that the water will be presented in thin sheets to the action of the heat.

The numeral 9 designates a sectional casing, preferably made of steel and lined with asbestos. This casing consists of two semi-cylindrical sections, the meeting edges of which are formed with vertical flanges, through which pass bolts to secure them together. The upper end of this casing is closed by a cylindrical cover 10, which is also a water-chamber. The fire-tubes communicate with the fire-box and with the space above the steam-drum. Secured to the said casing, near the upper and lower ends thereof, are baffle-plates 11 and 12, and similar plates 13 are also secured to the casing just above the water-chamber 5. Said casing is provided with a door (not shown) for closing the fuel-opening to the fire-box. A number of short fire-tubes 14 pass through the crown-sheets of the fire-box and terminate below the steam-drum.

The numeral 15 designates a pipe communicating with the steam-drum and connected with the main pipe 16. This latter pipe is provided with a steam-gage 17 and an automatic damper-regulator 18, connected by a chain 19 with a damper or regulator-door 20. These features, however, form no part of the present invention.

The numeral 21 designates the usual water-glass.

The operation is as follows: The water-chamber and water-tubes are filled with water, and also the lower half of the steam-drum. Fire now being started in the fire-box, the heat and products of combustion will ascend through the fire-tubes and escape at the upper end of the steam-drum, where they will strike the baffle-plates and be deflected over the top and down the rear of the steam-drum and then, turning, pass between the side baffle-plates and from thence around and between the tubes and thence between the lower baffle-plates and around the water-chamber and escaping at the smoke-flue. A certain portion of the flame from the fire-box will also pass through the short fire-tubes directly from the fire-box, meeting the return draft from the top of the steam-drum, so that any unconsumed gases carried by the return draft will be ignited and burned.

The water in the water-tubes will be presented in thin sheets, as it were, to the double action of the heat passing through the fire-tubes and to the return heat acting on the outside of the water-tubes.

The casing is provided with suitable handholes (not shown) for cleaning purposes.

As fast as the steam globules are formed they rise freely and naturally to the steam-drum, where the steam is subjected to the heat of the fire-tubes, thus making the steam dryer or superheating the same, and consequently increasing the heating power when the boiler is employed for heating purposes.

The water-chamber at the top of the casing forms the cover for the same, and the heat coming up through the fire-tubes strikes the chamber and increases the radiating efficiency.

A boiler constructed as above combines all the results attained by the drop-tube horizontal and vertical steam-boilers without the objectionable features incident thereto. There are no packed joints, no rubber or other packing being employed, nor are there any screwed joints to burn out.

Having thus fully described my invention, what I claim is—

1. In a steam-boiler, the combination with the base, the water-chamber comprising the concentric cylindrical walls and the crown-sheets at the upper ends thereof, the water-tubes connected with said water-chamber and the steam-drum with which the upper ends of said tubes are connected, of the fire-tubes passing through the water-tubes and also passing through the water-chamber and through the steam-drum, the short fire-tubes also passing through the top of the water-chamber and terminating below the steam-drum, the sectional casing and the top or cover thereof, substantially as described.

2. In a steam-boiler, the combination with the base, the water-chamber comprising the concentric cylindrical walls and crown-sheets, the water-tubes connected with the top of the water-chamber and the steam-drum with which the upper ends of said tubes are connected, of the fire-tubes passing through said water-tubes and through the top of the water-chamber and through the steam-drum, the short fire-tubes passing through the top of the water-chamber and terminating below the steam-drum, the sectional casing, the cylindrical top forming a water-chamber and the baffle-plates secured to the interior of said casing, substantially as described.

In testimony that I claim the foregoing as my own I have hereunto affixed my signature in presence of two witnesses.

FOSTER FRANK BIRCH.

Witnesses:
EUGENE J. COOPER,
WILLIAM F. BIRCH.